US010029694B2

(12) United States Patent
Sharp et al.

(10) Patent No.: US 10,029,694 B2
(45) Date of Patent: Jul. 24, 2018

(54) CONTROL STRATEGY FOR A POWERTRAIN SYSTEM

(71) Applicant: Caterpillar Inc., Peoria, IL (US)

(72) Inventors: Jeremy Sharp, Washington, IL (US); Suman Goli, Edwards, IL (US); Mark E Rettig, East Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/285,771

(22) Filed: Oct. 5, 2016

(65) Prior Publication Data

US 2018/0093670 A1    Apr. 5, 2018

(51) Int. Cl.
     *B60W 10/06*      (2006.01)
     *B60W 10/10*      (2012.01)
     *B60W 30/188*     (2012.01)
     *E02F 9/20*       (2006.01)
     *E02F 3/28*       (2006.01)

(52) U.S. Cl.
CPC ........ *B60W 30/1882* (2013.01); *B60W 10/06* (2013.01); *B60W 10/10* (2013.01); *E02F 9/2066* (2013.01); *E02F 9/2079* (2013.01); *B60W 2510/1005* (2013.01); *B60W 2520/10* (2013.01); *B60W 2710/0644* (2013.01); *B60W 2710/105* (2013.01); *E02F 3/283* (2013.01)

(58) Field of Classification Search
CPC .. B60W 10/06; B60W 10/10; B60W 30/1882; B60W 2510/06; B60W 2520/10; B60W 2710/0644; B60W 2710/105
See application file for complete search history.

(56) References Cited

U.S. PATENT DOCUMENTS

| 4,945,483 | A * | 7/1990 | Tokoro .................. B60W 30/18 474/12 |
|---|---|---|---|
| 6,328,671 | B1 | 12/2001 | Nakajima et al. |
| 7,322,902 | B2 | 1/2008 | Tabata et al. |
| 7,941,259 | B2 | 5/2011 | Tabata et al. |
| 7,962,768 | B2 | 6/2011 | Grill et al. |
| 8,157,035 | B2 | 4/2012 | Whitney et al. |
| 8,287,429 | B2 | 10/2012 | Kumazaki et al. |
| 8,738,207 | B2 | 5/2014 | Holmes et al. |
| 8,788,156 | B2 | 7/2014 | Nishimura |
| 8,874,290 | B2 | 10/2014 | Kumazaki et al. |
| 8,892,339 | B2 | 11/2014 | Ma et al. |
| 9,227,525 | B2 | 1/2016 | Fleege et al. |

(Continued)

*Primary Examiner* — Edwin A Young

(57) ABSTRACT

A control system for a powertrain in a machine includes a first sensor which generates a first signal indicative of a ground speed of the machine. The control system includes a second sensor which generates a second signal indicative of a load of an engine in the powertrain. The control system includes a third sensor which generates a third signal indicative of an operational state of the machine. The control system includes an input device which enables an operator to generate a request for a powertrain output. The control system further includes a controller in communication with the first sensor, the second sensor, the third sensor and the input device. The controller determines an engine speed command and a transmission output torque command to produce a powertrain output based at least on the first signal, the second signal and the third signal in response to the requested powertrain output.

20 Claims, 4 Drawing Sheets

(56) References Cited

U.S. PATENT DOCUMENTS

| | | | | |
|---|---|---|---|---|
| 2005/0101436 | A1* | 5/2005 | Funato | B60W 10/06 477/107 |
| 2008/0248925 | A1* | 10/2008 | Nakamura | F16H 61/061 477/149 |
| 2013/0116088 | A1* | 5/2013 | Gibson | B60W 10/06 477/80 |

* cited by examiner

CONTROL STRATEGY FOR A POWERTRAIN SYSTEM

TECHNICAL FIELD

The present disclosure relates to a control system for a powertrain system coupled to an internal combustion engine of a machine. More specifically, the present disclosure relates to controlling the powertrain system based on an operational status of the machine.

BACKGROUND

Machines, such as a wheel loader, a dozer, and the like, are typically designed to perform a variety of different operations. Generally, such operations include various work cycles that may be performed repetitively. The work cycles may include operations, such as a dig segment, a lift segment, a dump segment and the like. Moreover, different amounts of power may be required to perform one or more of these operations. Many methods have been implemented in the past to improve an efficiency of the machine while performing these operations.

Various operating strategies have been proposed to optimize engine performance according to different segments of the work cycle. For example, where fuel is injected at a time or according to a manner of injection such that the fuel will be burned as completely as possible. Other strategies limit operation of an engine or machine more directly, such as by placing limits on engine speed or engine torque. In either case, a tradeoff in performance is commonly observed.

Also, some of the methods include an operator manually entering operational mode of the machine in a control system. Such systems rely heavily on operator's discretion and experience. Manually judging the requirements of the machine, even in case of an experienced operator, may be cumbersome and inefficient. Further, the operator may not put in such effort and may operate the machine is a single mode only. The selection of operational mode of the machine should preferably be made automatically.

U.S. Pat. No. 7,962,768 describes a control system having a power source, an operator input device, a work implement and a controller in communication with the power source and the operator input device. The work implement may be driven by the power source to accomplish a task. The controller may be configured to classify a currently performed task, and adjust power source operation based on the task signal and the classification. However, an improved control system for task-specific control of a powertrain system is required.

SUMMARY

In an aspect of the present disclosure, a control system for a powertrain in a machine is provided. The control system includes a first sensor which generates a first signal indicative of a ground speed of the machine. The control system includes a second sensor which generates a second signal indicative of a load of an engine in the powertrain. The control system includes an operational state determination module which generates operational data indicative of an operational state of the machine. The control system includes an input device which enables an operator to generate a request for a powertrain output. The control system further includes a controller in communication with the first sensor, the second sensor, the operational state determination module and the input device. The controller receives the first signal indicative of the ground speed of the machine. The controller receives the second signal indicative of the load of the engine in the powertrain. The controller receives the operational data indicative of the operational state of the machine. The controller receives the powertrain output request generated based on an input from the operator. The controller determines an engine speed command based at least on the first signal, the second signal, and the operational state of the machine. The controller determines a transmission output torque command based on the first signal, and the operational state of the machine. The controller further determines a powertrain output based on the determined engine speed command and the determined transmission output torque command such that the determined powertrain output is less than or equal to the powertrain output request generated based on the input from the operator.

In another aspect of the present disclosure, a powertrain system for a machine is provided. The powertrain system includes an engine and a transmission coupled to the engine. The powertrain system includes a first sensor which generates a first signal indicative of a ground speed of the machine. The powertrain system includes a second sensor which generates a second signal indicative of a load of the engine. The powertrain system includes an operational state determination module which generates operational data indicative of an operational state of the machine. The powertrain system includes an input device which enables an operator to generate a request for a powertrain output. The powertrain system further includes a controller in communication with the first sensor, the second sensor, the operational state determination module and the input device. The controller receives the first signal indicative of the ground speed of the machine. The controller receives the second signal indicative of the load of the engine. The controller receives the operational data indicative of the operational state of the machine. The controller receives the powertrain output request generated based on an input from the operator. The controller determines an engine speed command based at least on the first signal, the second signal, and the operational state of the machine. The controller determines a transmission output torque command based on the first signal, and the operational state of the machine. The controller further determines a powertrain output based on the determined engine speed command and the determined transmission output torque command such that the determined powertrain output is less than or equal to the powertrain output request generated based on the input from the operator.

In yet another aspect of the present disclosure, a method of operating a machine is provided. The machine includes a powertrain having an engine and a transmission. The method includes receiving a first signal indicative of a ground speed of the machine by a controller. The method includes receiving a second signal indicative of a load of the engine by the controller. The method includes receiving operational data indicative of an operational state of the machine by the controller. The method includes receiving a powertrain output request generated based on an input from an operator. The method includes determining an engine speed command based at least on the first signal, the second signal, and the operational state of the machine. The method includes determining a transmission output torque command based on the first signal, and the operational state of the machine. The method further includes determining a powertrain output based on the determined engine speed command and the determined transmission output torque command such that the determined powertrain output is less than or equal to the powertrain output request generated based on the input from the operator.

DETAILED DESCRIPTION

Figure 1:
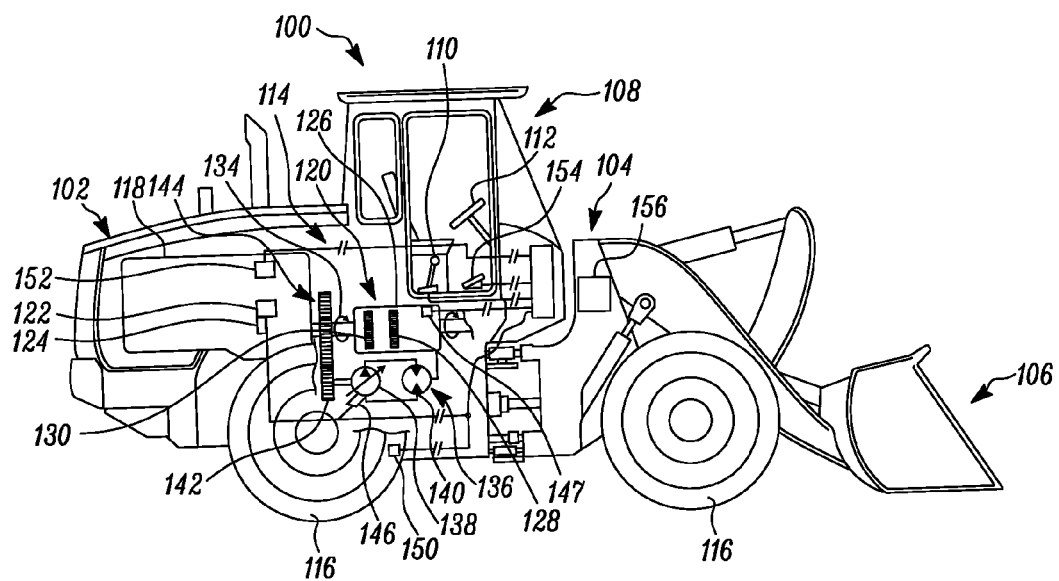
FIG. 1 is a side view of a machine having a powertrain system, according to an aspect of the present disclosure.

Wherever possible, the same reference numbers will be used throughout the drawings to refer to same or like parts. Referring to FIG. 1, an exemplary machine 100 is shown. The machine 100 is embodied as a wheel loader used, for example, for capturing and dumping loose material in mining, agriculture, landfill, construction, and other industries. Alternatively, the machine 100 may be any other machine such as, an excavator, a dozer, a dump truck, and so on that performs operations associated with industries such as mining, construction, farming, transportation, landscaping, or the like. While the following detailed description describes an exemplary aspect in connection with the wheel loader, it should be appreciated that the description applies equally to the use of the present disclosure in the other machines as well.

The machine 100 includes a back frame unit 102 and a front frame unit 104 which may articulate relative to the back frame unit 102. An implement system 106 is coupled with the front frame unit 104. An operator cab 108 is mounted on the back frame unit 102. The operator cab 108 includes various control systems and input devices for an operator to control the machine 100. For example, the operator cab 108 can be equipped with various mechanisms for controlling and operating the machine 100, including a gear shift lever 110, a steering wheel 112, and implement system controls etc. A powertrain system 114 provides traction power to a plurality of ground-engaging elements 116 shown as ground engaging wheels, the implement system 106 as well as various other components of the machine 100 not described here. It should be contemplated that the ground-engaging elements 116 may be tracks as well.

The powertrain system 114 includes an engine 118, such as a compression ignition engine, coupled with a transmission system 120. An engine throttle 122 is provided to control a flow of fuel to the engine 118, and includes a throttle actuator 124. The transmission system 120 includes a mechanical transmission 126 having a plurality of gears 128 and 130, and a torque control mechanism. The transmission system 120 includes an output shaft 134 which rotates to provide a transmission output torque. A mechanical power transmission path including the gears 128 and 130 is provided by the mechanical transmission 126. The torque control mechanism may further apply a torque to the mechanical transmission 126, which can be applied to the output shaft 134, internally to the gears 128 and 130, to an input shaft (not shown), or otherwise by any suitable means. The transmission system 120 may include a variable-torque transmission such that a direct mechanical coupling from the engine 118 applies torque to the output shaft 134 via the mechanical power transmission path, and a non-mechanical power transmission path formed in part by the torque control mechanism which also applies torque to the output shaft 134. In such an embodiment, the transmission system 120 acts as a hybrid transmission system. A variety of different hybrid transmission types are contemplated within the context of the present disclosure.

In the illustrated embodiment, the torque control mechanism includes a hydraulic variator 136 having a pump 138 and a motor 140. The pump 138 may be driven by a pump gear 142 coupled with a gear train 144 of the engine 118. The pump 138 may be driven electrically as well. The motor 140 may apply torque to the transmission system 120 so as to vary a torque of the output shaft 134 by way of any suitable configuration, and various designs which are well known and widely used. It should be contemplated that instead of a hydro-mechanical hybrid transmission, an electro-mechanical hybrid transmission may also be used. Further, a hydrostatic transmission may also be used. It should be understood that although the present disclosure will be discussed with reference to a variable torque type transmission, the present disclosure is not limited to any particular type of transmission.

In an embodiment, the torque control mechanism may comprise an example of a torque control mechanism for the powertrain system 114 that is structured to vary the output torque of the output shaft 134. The pump 138 may have a variable displacement, and includes an actuator 146 which can vary pump displacement so as to vary the manner in which the torque control mechanism interacts with the mechanical transmission 126, such as by varying a magnitude of torque that is applied and blended with the torque of the direct mechanical coupling between the engine 118 and the output shaft 134. In an electro-mechanical hybrid system, for example, an electric motor torque applied to be blended with direct mechanical torque from the engine 118 could be varied to analogous effect. Numerous other combinations of hydraulic components, mechanical components, and electrical components can be combined to various ends in the powertrain system 114 as per the need of the present discourse.

The machine 100 includes a gear sensor 147 to determine a present transmission gear or a range of transmission gear within which the machine 100 is operating. The gear sensor 147 may generate signals corresponding to the present transmission gear of the machine 100. The machine 100 further includes a first sensor 150 which generates a first signal 210 (shown in FIG. 2) corresponding to a ground speed of the machine 100. The first sensor 150 may be a wheel rotation sensor, a ground-sensing radar, a driveline speed sensor, a global or local positioning system sensor(s) structured to receive satellite signals, or any other suitable mechanism or group of mechanisms for directly or indirectly determining the ground speed of the machine 100. The machine 100 includes a second sensor 152 which generates a second signal 202 (shown in FIG. 2) corresponding to a load or torque of the engine 118 in the powertrain system 114. In the illustrated embodiment, the second sensor 152 is depicted as an individual unit. However, it will be appreciated that multiple different individual sensors may also be used to determine the engine load (interchangeably called as engine torque). Accordingly, the second sensor 152 may include multiple different sensors to determine the engine load.

The machine 100 includes an input device 154 positioned in the operator cab 108. The input device 154 may be an accelerator pedal, a control lever or joystick, a touchscreen, buttons, or any other such instrument which can be manipulated by the operator. The input device 154 enables the operator to generate a request for a powertrain output. The input device 154 may be depressed part-way to request one-half of a theoretically available powertrain output, or depressed all the way to a floor of the operator cab 108 to request a full powertrain output. The term powertrain output can be understood to mean a power output applied to the output shaft 134. Accordingly, with the input device 154 depressed all the way an operator could be requesting 100% of the power output theoretically available from the output shaft 134, including torques blended from one of the gears 128, 130 and from the torque control mechanism 132.

The machine 100 further includes an operational state determination module (not shown) which generates operational data corresponding to an operational state of the machine 100. The machine 100 may perform a sequence of steps known as a work cycle to perform an intended task as per the need of the present application. The operational state of the machine 100 refers to a stage of the work cycle currently being performed by the machine 100. The operational state determination module generates the operational data from a single or multiple sensors, such as, but not limited to, an accelerometer, a gyroscope, a velocity sensor, a fluid level sensor for implement cylinders, a swing velocity sensor, a pressure sensor, a payload sensor, a position sensor etc.

The operational data generated by the operational state determination module is processed to determine the operational state of the machine 100. The operational state determination module may either process the operational data onboard or transmit the operational data to an off-board location for processing. The operational data may be compared with historical data models or a set of rules/constraints to determine the operational state of the machine 100. After determining the operational state of the machine 100, the operational state determination module may also determines an application/segment mode 212 (shown in FIG. 2), the machine 100 should ideally be operating in while performing a particular stage of the work cycle. The application/segment mode can be either one of an economy mode or a performance mode. The machine 100 further includes a controller 156.

The controller 156 is not to be taken to mean that a single processor or computing device, or even a single physical control module or the like is required. The controller 156 might include multiple separate and individual processors working cooperatively to produce an engine speed command 236 (shown in FIG. 2) and a transmission output torque command 302 (shown in FIG. 3). The engine speed command 236 and the transmission output torque command 302 can each prompt the generation of an electrical signal such as electrical currents, to the throttle actuator 124 coupled with the engine throttle 122 and to the actuator 146 of the pump 138. The throttle actuator 124 can position the engine throttle 122 in a prescribed manner to produce a desired engine speed. The actuator 146 can position a swash plate or the like (not shown) in the pump 138 to produce a desired pump displacement.

The controller 156 is further in communication with each of the first sensor 150, the second sensor 152, the input device 154 and the operational state determination module. In one embodiment, the operational state determination module may be an integral part of the controller 156. It will be appreciated that the ground speed and the engine load acted upon by the controller 156 can be observed or apparent ground speed and observed or apparent engine load, as the first sensor 150 and the second sensor 152 will typically have some, error even if minor. As noted above, the extent to which a commanded powertrain output departs from an operator requested output may vary depending upon the operational state of the machine 100.

Figure 2:
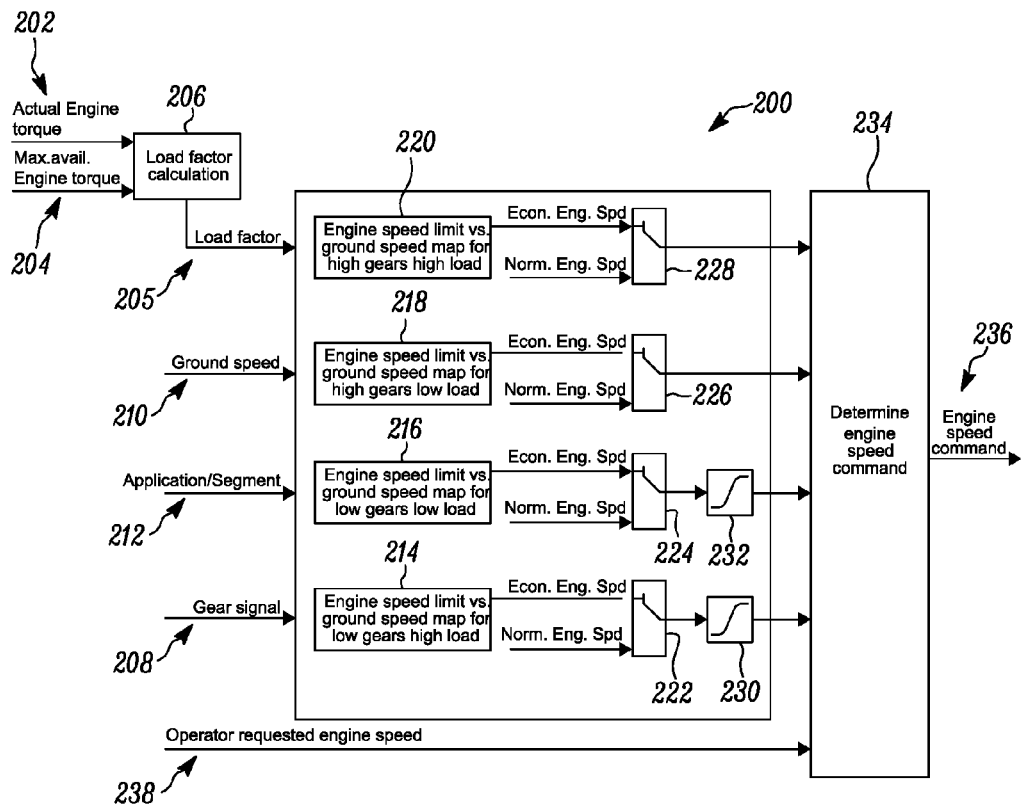
FIG. 2 is a functional block diagram of a controller features and functions for controlling the machine, according to an aspect of the present disclosure.

Referring to FIG. 2, a first functional part 200 of the controller 156 for determination of the engine speed command 236 is shown. The controller 156 receives the second signal 202 generated by the second sensor 152 indicative of the engine torque (depicted as Actual engine torque). The controller 156 may also have a maximum available engine torque 204 (depicted as Max. avail. engine torque), which can be applied to the engine 118, stored in an associated memory of the controller 156. Alternatively, the controller 156 may be supplied with a value of the maximum available engine torque 204 by any other suitable means in accordance with the present disclosure. The controller 156 determines a load factor 205 through a load factor calculation module 206 based on the values of the actual engine torque and the maximum available engine torque 204. The controller 156 further receives the gear signal 208 generated by the gear sensor 147 indicative of the present transmission gear or the transmission gear ranges within which the machine 100 is operating. The controller 156 also receives the first signal 210 generated by the first sensor 150 indicative of the ground speed of the machine 100. Also, the controller 156 receives application/segment mode 212 from the operational state determination module.

The controller 156 determines an engine speed limit based on the first signal 210 indicative of the ground speed and the second signal 202 indicative of the engine load. The controller 156 determines engine speed limit for the economy mode. In the economy mode, an operator requested engine speed 238 exceeds the determined engine speed limit. In other words, the engine speed actually produced can be what the operator is requesting so long as the determined engine speed limit is not exceeded, in which case, the engine speed actually produced will be the engine speed limit. The controller 156 further determines another engine speed command that produces an engine speed equal to the operator requested engine speed 238 and provides a full requested powertrain output for the performance mode. The controller 156 further determines multiple different engine speed limits that are based upon the ground speed and the engine load. The multiple engine speed limits may be determined from a multiple different maps stored in the memory of the controller 156 each including a ground speed coordinate and an engine speed coordinate.

In the illustrated embodiment, the maps are specific to a present gear or gear range of the machine 100. An engine speed limit vs. ground speed map for low gear(s) and high load is shown at 214. An engine speed limit vs. ground speed map for low gear(s) and low load is shown at 216. An engine speed limit vs. ground speed map for high gear(s) and low load is shown at 218, and an engine speed limit vs. ground speed map for high gear(s) and high load is shown at 220. During economy or performance mode operation, the engine speed limits can be determined from one or more normal or full performance operation map(s) (not shown), typically providing whatever engine speed is called for according to the operating conditions.

Multiple switches 222, 224, 226, 228 are shown that receive either of a normal engine speed limit (depicted as Norm. Eng. Spd.), or an economy engine speed limit (depicted as Econ. Eng. Spd.) determined from one of the maps 214, 216, 218, 220. The normal engine speed limit corresponds to the engine speed limit for the performance mode. It should be contemplated that any number of maps corresponding to any number of values of load factor 205 and/or any number of gears or gear ranges might be used. While the machine 100 is operating in the economy mode, the switches 222, 224, 226, 228 provide the Economy Engine Speed limits. Similarly, while the machine 100 is operating in the performance mode, the switches provide the Normal Engine Speed limits. Gain calculations 230 and 232 are provided to modify engine speed limits according to specific present operating conditions. For instance, a gain might be applied where reducing engine speed too much would cause engine lugging, such as where the machine 100 is digging a pile of material or starting up an incline. The determined engine speed limits are processed in a block 234 to determine the engine speed command 236 by comparing with the operator requested engine speed 238.

Figure 3:
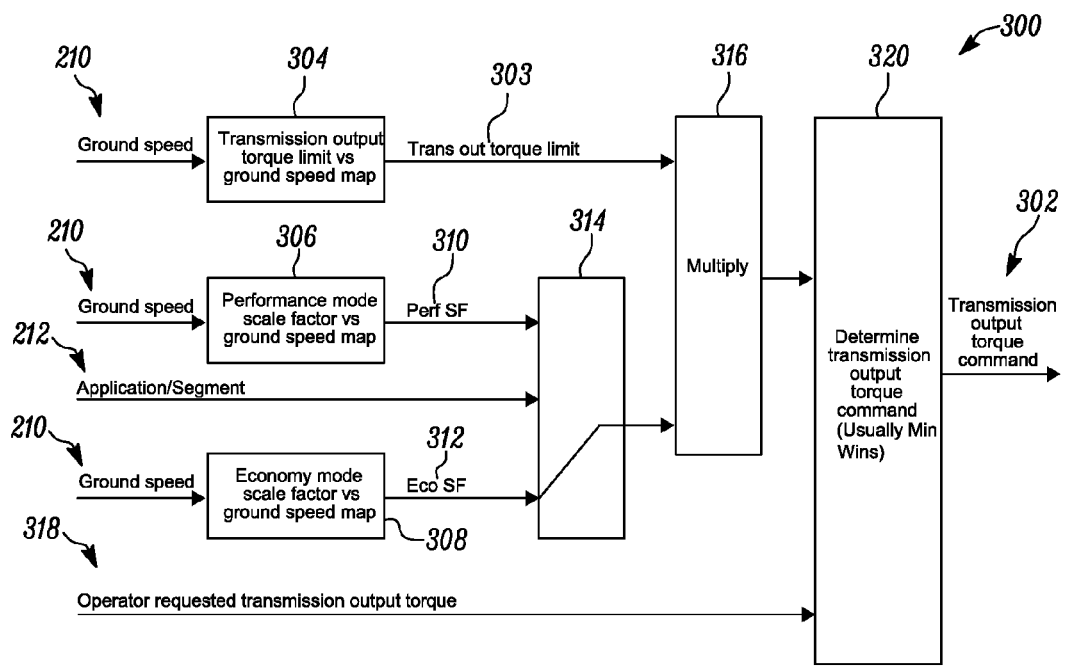
FIG. 3 is another functional block diagram of the controller features and functions for controlling the machine, according to an aspect of the present disclosure.

Referring to FIG. 3, a second functional part 300 of the controller 156 for determination of a transmission output torque command 302 is provided. The controller 156 receives the first signal 210 indicative of the ground speed from the first sensor 150 and determines a transmission output torque limit 303. The controller 156 may have stored in the associated memory a transmission output torque limit map 304 having a transmission output torque coordinate and a ground speed coordinate. The controller 156 includes a performance mode scale factor map 306 and an economy mode scale factor map 308. The performance mode scale factor map 306 and the economy mode scale factor map 308 have a scale factor coordinate and a ground speed coordinate. Based on the first signal 210 indicative of the ground speed of the machine 100, a performance mode scale factor 310 and an economy mode scale factor 312 is determined from the performance mode scale factor map 306 and the economy mode scale factor map 308 respectively. The performance mode scale factor 310 and the economy mode scale factor 312 are mapped to the ground speed. Using a scale factor to determine the transmission output torque command 302 can allow the engine 118 to be controlled according to a single lug curve. The varying of the scale factor with respect to the ground speed may be non-uniform, and may vary between a higher value for a lower ground speed and a lower value for a higher ground speed in at least some instances. The higher value may be equal to about 1.0.

The performance mode scale factor map 306 and the economy mode scale factor map 308 can thus provide a value of the scale factor that is dependent upon the ground speed. For performance mode operation, the commanded transmission output torque command 302 may be substantially what the operator is requesting as per the requested output torque. The performance mode scale factor 306 value of 1.0 can be applied to such situations. Accordingly, in some instances the controller 156 may be designed such that the performance mode scale factor map 306 always returns the performance mode scale factor 310 as 1.0, although the present disclosure is not limited to such application only. For the economy mode operation, such as at lower ground speeds, the economy mode scale factor 312 applied may be approximately 1.0 in some instances, and less than 1.0 in other instances. It should be contemplated that even though scale factor maps are shown for the performance mode and the economy mode only, there may also be maps for other operational modes of the machine 100 as per the current application/segment mode 212 if required. The present disclosure, in any way, is not limited a specific number of modes and can be applied to any number of modes as suitable to the need of the current application.

The second functional part 300 of the controller 156 further includes a switch 314 which changes its state as per the application/segment mode 212. The switch 314 provides the performance mode scale factor 310 when the application/segment mode 212 is the performance mode and the economy mode scale factor 312 when the application/segment mode 212 is the economy mode. The scale factor determined by the switch 314 is multiplied with the transmission output torque limit 303 at a multiply block 316. The value after the multiplication of the transmission output torque limit 303 and the scale factor is compared with an operator requested transmission output torque 318 and the transmission output torque command 302 is determined at block 320 based on the two values.

The controller 156 determines a powertrain output based on the engine speed command 236 and the transmission output torque command 302. The powertrain output is either less than or equal to the powertrain output request generated by the operator. For the economy mode, the powertrain output is less than the powertrain output request generated by the operator. For the performance mode, the powertrain output is less than or equal to the powertrain output request generated by the operator.

The controller 156 determines the application/segment mode 212 based on the operational data through the operational state determination module. The application/segment mode 212 is selected from one of the economy mode and the performance mode based on the operational state of the machine 100. The controller 156 adjusts the operation of the machine 100 accordingly by adjusting the powertrain output produced. The controller 156 switches the powertrain output between the economy powertrain output and the performance powertrain output based on the operational state of the machine 100. This operation of the controller 156 is explained with the help of an exemplary work cycle.

An exemplary work cycle of the machine 100 may include steps of digging material from a ground surface, travelling to a dump location, and dumping the material at the dump location. As the controller 156 is in communication with the operational state determination module, the controller 156 has the information regarding the current step of the work cycle the machine 100 is operating within. The controller 156 adjusts the powertrain output accordingly to operate the machine 100 in the most efficient manner. For the step of digging the material from the ground surface, the controller 156 operates the machine 100 in the performance mode and produces the performance powertrain output. For the steps of travelling to the dump location and dumping the material at the dump location, the controller 156 operates the machine 100 in the economy mode and produces the economy powertrain output.

INDUSTRIAL APPLICABILITY

Figure 4:
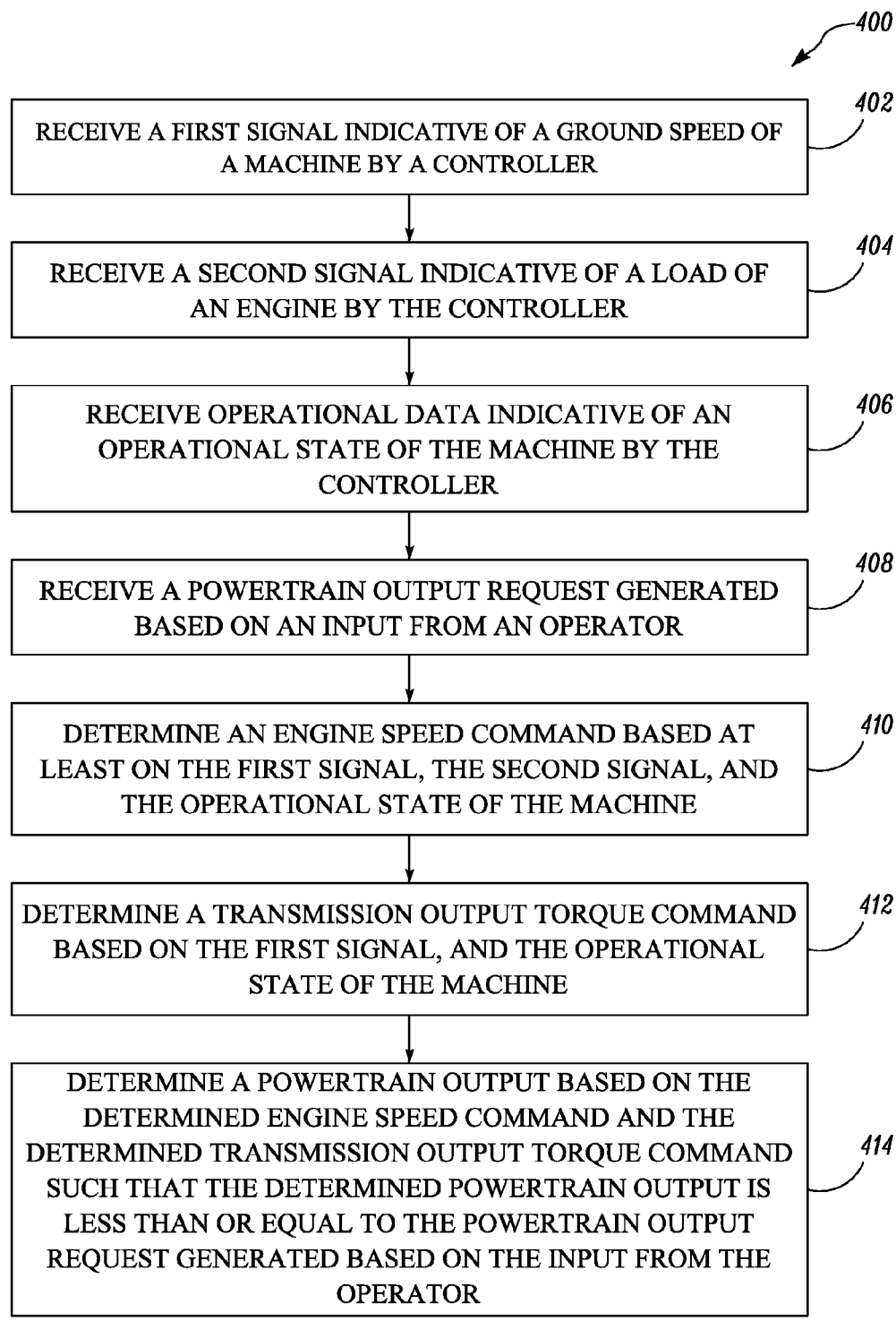
FIG. 4 is a flow chart of a method for controlling the machine, according to an aspect of the present disclosure.

The present disclosure provides a control strategy for controlling the machine 100 so as to achieve better fuel efficiency and performance of the machine 100. A method 400 of controlling the machine 100 is explained with the help of FIG. 4. The method 400 at block 402 receives the first signal 210 indicative of the ground speed of the machine 100 by the controller 156. The first signal 210 is generated by the first sensor 150. The method 400 at block 404 receives the second signal 202 indicative of the engine load by the controller 156. The second signal 202 is generated by the second sensor 152. The method 400 at block 406 receives the operational data indicative of the operational state of the machine 100 by the controller 156. The operational data is generated by the operational state determination module. The method 400 at block 408 receives the powertrain output request which is generated on the basis of the input from the operator through the input device 154.

The method 400 at block 410 determines the engine speed command 236 based on the first signal 210, the second signal 202 and the operational state of the machine 100. The method 400 at block 412 determines the transmission output torque command 302 based on the first signal 210 and the operational state of the machine 100. The method 400 at block 414 further determines the powertrain output based on the engine speed command 236 and the transmission output torque command 302. The determined powertrain output is either less than or equal to the powertrain output request generated based on the input from the operator.

The controller 156 switches the powertrain output between the economy powertrain output and the performance powertrain output without any intervention from the operator. The controller 156 accurately determines the most efficient mode to operate the machine 100, and switches the powertrain output accordingly as per the operational state of the machine 100. Thus, the automatic switching of the economy and performance modes improves fuel efficiency of the engine 118 and hence, enhances productivity of the machine 100. Further, taking the control of switching economy and performance modes from the operator causes less fatigue of the operator and eliminates any negligence on part of the operator. This ensures operation of the machine 100 in most suitable mode of operation at all times.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A control system for a powertrain in a machine, the control system comprising:
   a first sensor configured to generate a first signal indicative of a ground speed of the machine;
   a second sensor configured to generate a second signal indicative of a load of an engine in the powertrain;
   an operational state determination module configured to generate operational data indicative of an operational state of the machine;
   an input device configured to enable an operator to generate a powertrain output request; and
   a controller communicably coupled to the first sensor, the second sensor, the operational state determination module, and the input device,
   the controller being configured to:
      receive the first signal indicative of the ground speed of the machine;
      receive the second signal indicative of the load of the engine in the powertrain;
      receive the operational data indicative of the operational state of the machine;
      receive the powertrain output request generated based on an input from the operator;
      determine an engine speed command based at least on the first signal, the second signal, and the operational state of the machine;
      determine a transmission output torque command based on the first signal and the operational state of the machine;
      determine a powertrain output based on the determined engine speed command and the determined transmission output torque command such that the determined powertrain output is less than or equal to the powertrain output request generated based on the input from the operator; and
      control the powertrain based on the determined powertrain output.

2. The control system of claim 1, wherein the operational state of the machine is a stage of a work cycle of the machine.

3. The control system of claim 1, wherein the determined powertrain output is an economy powertrain output,
   the economy powertrain output being less than the powertrain output request generated based on the input from the operator.

4. The control system of claim 3,
   wherein the controller is further configured to:
      determine an engine speed limit based on the first signal, and
   wherein, when determining the engine speed command, the controller is configured to:
      determine the engine speed command based upon the engine speed limit.

5. The control system of claim 4, wherein the controller is further configured to:
   determine a plurality of engine speed limits from a plurality of maps stored in the controller,
      each of the plurality of maps including a ground speed coordinate and an engine speed coordinate.

6. The control system of claim 5, wherein, when determining the engine speed limit, the controller is configured to:
   determine the engine speed limit from one of the plurality of maps that is selected based upon the second signal indicative of the load of the engine in the powertrain and a present transmission gear or gear range of a transmission of the machine.

7. The control system of claim 3,
   wherein the controller is further configured to:
      determine a transmission output torque limit based on the first signal, and
   wherein, when determining the transmission output torque command, the controller is configured to:
      determine the transmission output torque command based upon the transmission output torque limit and an economy scale factor that varies with the first signal.

8. The control system of claim 1, wherein the determined powertrain output is a performance powertrain output,
   the performance powertrain output being less than or equal to the powertrain output request generated based on the input from the operator.

9. The control system of claim 8,
   wherein the controller is further configured to:
      determine an engine speed limit based on the first signal, and
   wherein, when determining the engine speed command, the controller is configured to:
      determine the engine speed command based upon the engine speed limit.

10. The control system of claim 8,
wherein the controller is further configured to:
   determine a transmission output torque limit based on the first signal, and
wherein, when determining the transmission output torque command, the controller is configured to:
   determine the transmission output torque command based upon the transmission output torque limit and a performance scale factor that varies with the first signal.

11. A powertrain system for a machine, the powertrain system comprising:
   an engine;
   a transmission coupled to the engine;
   a first sensor configured to generate a first signal indicative of a ground speed of the machine;
   a second sensor configured to generate a second signal indicative of a load of the engine;
   an operational state determination module configured to generate operational data indicative of an operational state of the machine;
   an input device configured to enable an operator to generate a powertrain output request; and
   a controller communicably coupled to the first sensor, the second sensor, the operational state determination module, and the input device,
      the controller being configured to:
         receive the first signal indicative of the ground speed of the machine;
         receive the second signal indicative of the load of the engine;
         receive the operational data indicative of the operational state of the machine;
         receive the powertrain output request generated based on an input from the operator;
         determine an engine speed command based at least on the first signal, the second signal, and the operational state of the machine;
         determine a transmission output torque command based on the first signal and the operational state of the machine;
         determine a powertrain output based on the determined engine speed command and the determined transmission output torque command such that the determined powertrain output is less than or equal to the powertrain output request generated based on the input from the operator; and
         control the powertrain system based on the determined powertrain output.

12. The powertrain system of claim 11, wherein the operational state of the machine is a stage of a work cycle of the machine.

13. The powertrain system of claim 11, wherein the determined powertrain output is an economy powertrain output,
   the economy powertrain output being less than the powertrain output request generated based on the input from the operator.

14. The powertrain system of claim 13,
wherein the controller is further configured to:
   determine an engine speed limit based on the first signal, and
wherein, when determining the engine speed command, the controller is configured to:
   determine the engine speed command based upon the engine speed limit.

15. The powertrain system of claim 13,
wherein the controller is further configured to:
   determine a transmission output torque limit based on the first signal, and
wherein, when determining the transmission output torque command, the controller is configured to:
   determine the transmission output torque command based upon the transmission output torque limit and an economy scale factor that varies with the first signal.

16. The powertrain system of claim 11, wherein the determined powertrain output is a performance powertrain output,
   the performance powertrain output being less than or equal to the powertrain output request generated based on the input from the operator.

17. The powertrain system of claim 16,
wherein the controller is further configured to:
   determine an engine speed limit based on the first signal, and
wherein, when determining the engine speed command, the controller is configured to:
   determine the engine speed command based upon the engine speed limit.

18. The powertrain system of claim 16,
wherein the controller is further configured to:
   determine a transmission output torque limit based on the first signal, and
wherein, when determining the transmission output torque command, the controller is configured to:
   determine the transmission output torque command based upon the transmission output torque limit and a performance scale factor that varies with the first signal.

19. A method of operating a machine including a powertrain having an engine and a transmission, the method comprising:
   receiving, by a controller, a first signal indicative of a ground speed of the machine;
   receiving, by the controller, a second signal indicative of a load of the engine;
   receiving, by the controller, operational data indicative of an operational state of the machine;
   receiving, by the controller, a powertrain output request generated based on an input from an operator;
   determining, by the controller, an engine speed command based at least on the first signal, the second signal, and the operational state of the machine;
   determining, by the controller, a transmission output torque command based on the first signal and the operational state of the machine; and
   determining, by the controller, a powertrain output based on the determined engine speed command and the determined transmission output torque command such that the determined powertrain output is less than or equal to the powertrain output request generated based on the input from the operator; and
   controlling, by the controller, the powertrain based on the determined powertrain output.

20. The method of claim 19, wherein the operational state of the machine is a stage of a work cycle of the machine.

* * * * *